United States Patent
Fried et al.

(10) Patent No.: US 11,907,124 B2
(45) Date of Patent: Feb. 20, 2024

(54) USING A SHADOW COPY OF A CACHE IN A CACHE HIERARCHY

(71) Applicant: International Business Machines Corporation, Armonk, NY (US)

(72) Inventors: Yair Fried, Petah Tiqwa (IL); Aaron Tsai, Hyde Park, NY (US); Eyal Naor, Tel-Aviv (IL); Christian Jacobi, West Park, NY (US); Timothy Bronson, Round Rock, TX (US); Chung-Lung K. Shum, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/709,807

(22) Filed: Mar. 31, 2022

(65) Prior Publication Data
US 2023/0315631 A1 Oct. 5, 2023

(51) Int. Cl.
*G06F 12/0811* (2016.01)

(52) U.S. Cl.
CPC .... *G06F 12/0811* (2013.01); *G06F 2212/311* (2013.01)

(58) Field of Classification Search
CPC ............ G06F 12/0811; G06F 2212/311
See application file for complete search history.

(56) References Cited

U.S. PATENT DOCUMENTS

| | | | | |
|---|---|---|---|---|
| 4,872,111 | A * | 10/1989 | Daberkow | G06F 12/0855 |
| | | | | 712/E9.046 |
| 8,074,017 | B2 * | 12/2011 | Cavallo | G06F 3/0613 |
| | | | | 711/173 |
| 8,271,932 | B2 | 9/2012 | Bair et al. | |
| 8,484,529 | B2 | 7/2013 | Alves et al. | |
| 8,549,378 | B2 | 10/2013 | Alves et al. | |
| 8,799,571 | B1 * | 8/2014 | DesRoches | G06F 12/0811 |
| | | | | 711/170 |
| 9,563,548 | B2 | 2/2017 | Curley et al. | |
| 10,824,508 | B2 | 11/2020 | Meaney et al. | |
| 11,200,119 | B2 | 12/2021 | Meaney et al. | |
| 11,245,774 | B2 | 2/2022 | Paduroiu | |
| 2010/0106904 | A1 | 4/2010 | Berke et al. | |
| 2016/0179672 | A1 * | 6/2016 | Dell | G06F 12/0822 |
| | | | | 711/122 |
| 2017/0371786 | A1 | 12/2017 | Srinivasan et al. | |
| 2019/0332469 | A1 * | 10/2019 | Radjai | G06F 9/3816 |
| 2020/0371927 | A1 | 11/2020 | Chachad et al. | |

(Continued)

OTHER PUBLICATIONS

Liu et al.; "R-Memcached: A Reliable In-Memory Cache For Big Key-Value Stores", IEEE/Tsinghua Science And Technology, vol. 20, No. 6, pp. 560-573, Dec. 17, 2015.

(Continued)

*Primary Examiner* — Gurtej Bansal
(74) *Attorney, Agent, or Firm* — CANTOR COLBURN LLP; Edward Wixted (57) ABSTRACT

Aspects include using a shadow copy of a level 1 (L1) cache in a cache hierarchy. A method includes maintaining the shadow copy of the L1 cache in the cache hierarchy. The maintaining includes updating the shadow copy of the L1 cache with memory content changes to the L1 cache a number of pipeline cycles after the L1 cache is updated with the memory content changes.

19 Claims, 4 Drawing Sheets

(56) References Cited

U.S. PATENT DOCUMENTS

2021/0073375 A1* 3/2021 Milburn .................. G06F 21/54
2021/0208892 A1 7/2021 Wallach
2021/0390050 A1 12/2021 Chachad et al.

OTHER PUBLICATIONS

Meaney et al.; "IBM zEnterprise Redundant Array Of Independent Memory Subsystem", IBM Journal Of Research And Devel., vol. 56, Iss. 1.2, pp. 4:1-4:11, Jan.-Feb. 2012.
Patil et al.; "Dve': Improving DRAM Reliability And Performance On-Demand Via Coherent Replication", ACM/IEEE 48th Annual Inter. Symposium On, pp. 526-539, Jun. 14-19, 2021.
Wang et al.; "Reuse Distance-Based Copy-Backs Of Clean cache Lines To Lower-Level Caches", Cornell University Library, arXiv:2105.14442v2, pp. 1-6, May 30, 2021.
Zheng et al.; "Redundant Memory Array Architecture For Efficient Selective Protection", ISCA'17 44th ACM/IEEE Annual International Symposium On, pp. 214-227, Jun. 24-28, 2017.

* cited by examiner

USING A SHADOW COPY OF A CACHE IN A CACHE HIERARCHY

BACKGROUND

The present invention generally relates to optimizing computer reliability and performance, and more specifically, to using a shadow copy of a level 1 (L1) cache for storing data into a redundant array of independent memory (RAIM) based upstream cache memory.

Cache hierarchy, or multi-level caches, refers to a memory architecture that uses a hierarchy of memory structures based on varying access speeds to cache data. Highly requested data is cached in high-speed access memory, referred to as L1 cache, allowing faster access to the data by central processing unit (CPU) cores. Data that is requested less often may be stored in a memory of lower speed but at a higher capacity, such as a level 2 (L2) cache that is upstream from the L1 cache.

Techniques to detect and correct bit errors in memory devices have evolved into an elaborate science over the past several decades. A basic detection technique is the usage of parity. As an example, in an even parity scheme, the number of 1's or 0's in a data word are "exclusive or-ed" (XOR-ed) together to produce a parity bit. As such, the total number of 1's for the data word and its corresponding parity will always be even. The data word and the parity are then written into a memory structure together. If there is a single error present in the data word or the parity bit during a read operation, it can be detected by regenerating parity from the data and then checking to see that it matches the parity that is read in the same operation.

Richard Hamming recognized that the parity technique could be extended to not only detect errors, but to also correct errors by appending a multi-bit error correction code (ECC) field, to each data, or code, word. The ECC field is a combination of different bits in the word XOR-ed together so that some number of errors can be detected, pinpointed, and corrected. The number of errors that can be detected, pinpointed, and corrected is related to the length of the ECC field appended to the data word. ECC techniques have been used to improve availability of storage systems by correcting memory device (e.g., dynamic random access memory or "DRAM") failures so that customers do not experience data loss or data integrity issues due to failure of a memory device.

Redundant array of independent memory (RAIM) has been developed to improve performance and/or to increase the availability of storage systems. RAIM distributes data across several independent memory modules (each memory module contains one or more memory devices). There are many different RAIM schemes that have been developed each having different characteristics, and different pros and cons associated with them. Performance, availability, and utilization/efficiency (the percentage of the disks that actually hold customer data) are perhaps the most important. The tradeoffs associated with various schemes have to be carefully considered because improvements in one attribute can often result in reductions in another.

SUMMARY

One or more embodiments of the present invention are directed to using a shadow copy of a level 1 (L1) cache in a cache hierarchy. A non-limiting example computer-implemented method includes maintaining the shadow copy of the L1 cache in the cache hierarchy. The maintaining includes updating the shadow copy of the L1 cache with memory content changes to the L1 cache a number of pipeline cycles after the L1 cache is updated with the memory content changes.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention are directed to using a shadow copy of a level 1 (L1) cache for storing into a redundant array of independent memory (RAIM) based upstream cache memory. Within a computing system there are hierarchies of cache memories providing a processor with efficient access to data associated with memory locations. For each cache in a specific hierarchy, the cache holds the values of data corresponding to memory locations in the cache along with additional information required for maintaining and detecting the integrity of the data. Examples of schemes that can be used for error detection and/or error correction include, but are not limited to parity, error correction codes (ECCs), and RAIM.

RAIM is one of the more advanced data integrity methods. The RAIM scheme goes beyond what a typical ECC approach can cover, allowing detection of multiple bit flips and allowing more correction capabilities than ECC or parity. When a cache is adapting a RAIM based error scheme, the additional information required by the RAIM based protection scheme can be a set of payloads (referred to herein as "RAIM payloads") such that each payload corresponds/covers an entire cache line worth of data. Any update to a cache line will thus require regeneration of the corresponding RAIM payload.

Within a processor core, when a load-store-unit (LSU) is executing memory update instructions (e.g., a store instruction), the LSU updates (or stores into) the corresponding cache line in the L1 cache of the processor core. These updates to the L1 cache are typically performed on a byte-based granularity. At some point, the cache updates in the L1 cache will be required to be propagated in the upstream cache level(s) to ensure data consistency within the cache hierarchy. In one example, propagation to the upstream cache may be required if another processor in the system requests access to that same memory location. In another example, the location of the updated L1 cache line may be selected for installing a new and different cache line (e.g., the cache line is cast out), and contents of the updated L1 cache line need to be saved in its upstream cache before the new cache line is installed at the location of the updated L1 cache line.

In contemporary systems, when the upstream cache level (e.g., a level two cache or "L2 cache") is adopting a RAIM error protection scheme that is cache line based, each time that the L1 cache sends modified (or stored) data upstream to the L2 cache, the corresponding RAIM payload also needs to be sent. When the L1 cache is a store-through design, as determined by system reliability, availability, and serviceability (RAS) requirements, updated L1 cache contents need to be reflected in the upstream cache (in this example the L2 cache) in a timely basis. A "store-through design" ensures that software checkpoints are stored in a robustly protected structure (in a RAIM-based L2 cache) as soon as possible/practical such that any failure in the L1 cache will not be catastrophic to the software program since the L2 cache will have the latest storage checkpoint. A "store-in design" on the other hand will have the storage checkpoint only in the L1 cache, and if the L1 cache fails, the data will be lost.

When moving a cache line upstream in the cache hierarchy, a bridge is required between the L1 cache that is updated on a byte-based granularity (and uses byte parity for error detection) and the L2 cache which uses a cache line-based RAIM error detection scheme. Contemporary approaches to providing this bridge include first fetching the cache line from the L2 cache, and then merging in the L1 cache updates as they are processed (in the store-through case) or during store-in evictions. A disadvantage of this approach is that the "re-fetching" of the cache line for every L1 store update will directly impact the access bandwidth on the upstream cache, resulting in performance degradation.

Another contemporary approach to providing the bridge is to read the entire cache line from the L1 cache, and as each update is processed, merge in the changes and re-generate the RAIM payload on the fly. This approach can adversely impact the L1 cache read bandwidth. To alleviate this impact to the L1 cache read bandwidth, additional read ports can be added to the L1 cache, however this can lead to local wiring congestion and potential impacts to L1 cache access time and latency.

One or more embodiments of the present invention provide a bridge between the L1 cache and the L2 cache while avoiding the disadvantages of the contemporary approaches described above. One or more embodiments of the present invention include a shadow copy of the L1 cache and each time that a cache line is modified in the L1 cache it is also modified in the shadow cache. When it is time to update an upstream cache in the hierarchy (e.g., a L2 cache), the entire cache line is read from the shadow cache and the RAIM payload is generated on the fly. The cache line data (at least a portion cache line) and the RAIM payload are sent upstream to the L2 cache together. One or more embodiments of the present invention avoid the "re-fetching" of the cache line from the L2 cache and the impact to the cache read bandwidth of the contemporary approaches described above.

In accordance with one or more embodiments of the present invention, the updating of an upstream cache (e.g., L2 cache) is performed at its (the upstream cache's) access granularity without first reading from the upstream cache for any unchanged content to merge with the memory content changes. The shadow copy of the downstream cache is used to provide a contiguous/aligned block of data including both data updated by stores to the downstream cache (e.g., L1 cache) and data not updated by stores to the downstream cache. The shadow copy of the downstream cache is used to merge the changed data with the unchanged data. This approach can be particularly useful, for example, when the upstream cache requires a minimum block size of the data (e.g., has an access granularity of a cache line of 256 bytes) that is larger than the smallest block (e.g., four bytes) that can be updated by a store to the downstream cache. By storing the minimum block size of the data that can be written to the upstream cache in the shadow copy, the shadow copy is able to supply background data sufficient to avoid a read-modify write (RMW) in the upstream cache when the data is written to the upstream cache.

Figure 1:
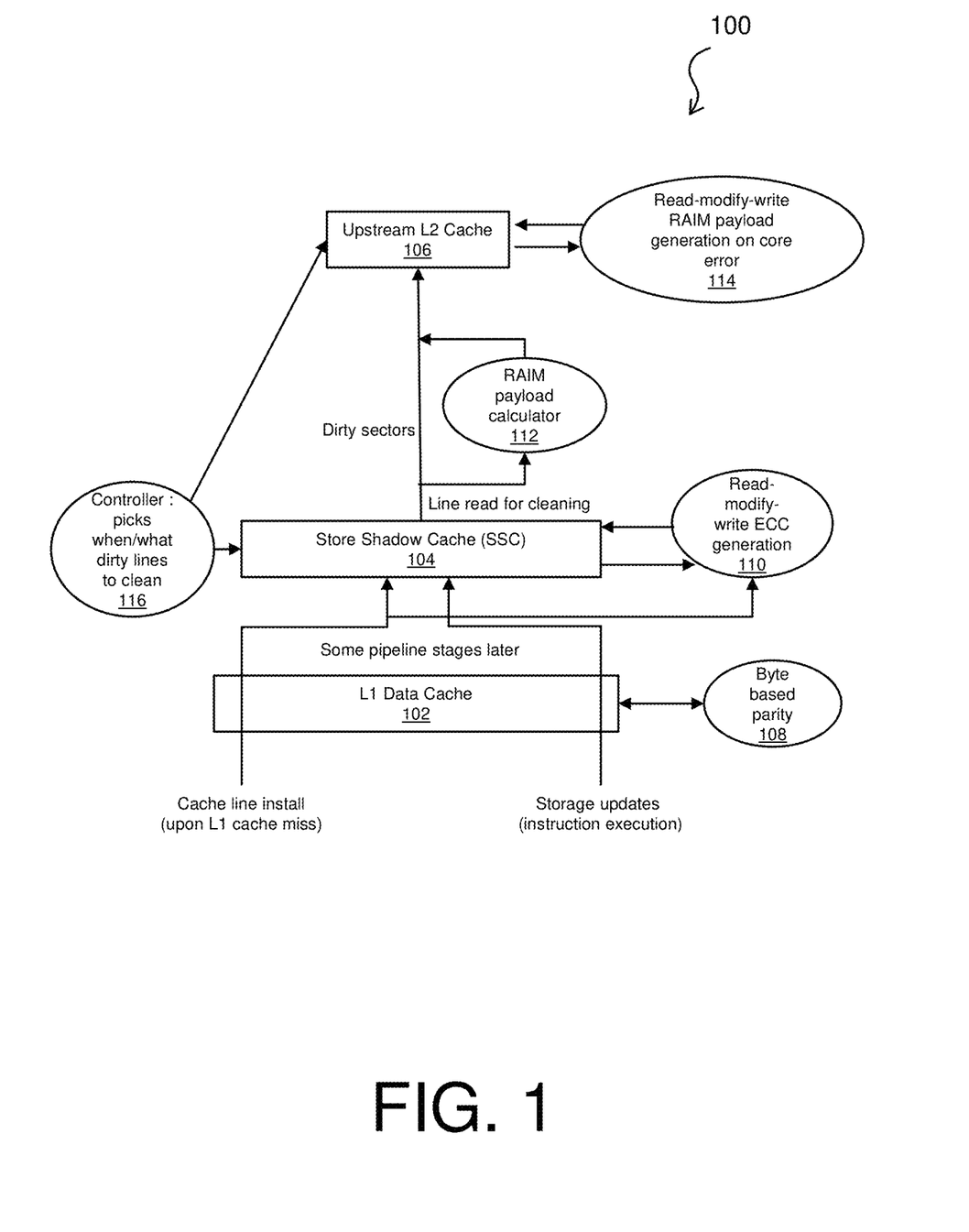
FIG. 1 depicts a block diagram of components of a system for using a shadow copy of a level 1 (L1) cache for storing into a redundant array of independent memory (RAIM) based upstream cache memory in accordance with one or more embodiments of the present invention.

Turning now to FIG. 1, a block diagram of components of a system 100 for using a shadow copy of a L1 cache for storing into a RAIM based upstream cache memory is generally shown in accordance with one or more embodiments of the present invention. All or a subset of the processing and components described in reference to FIG. 1 can be performed or provided by all or a subset of system 400 of FIG. 4. The system 100 shown in shown in FIG. 1 includes an L1 data cache 102, a store shadow cache (SSC) 104, and an upstream L2 cache 106.

The cache hierarchy shown in FIG. 1 includes L1 data cache 102 and upstream L2 cache 104. Other cache hierarchies can include additional levels such as, but not limited to a L1 cache(s), a level two (L2) cache(s), and a level three (L3) cache(s). When there are three cache levels in a hierarchy, the L3 cache is upstream from the L2 cache which is upstream from the L1 cache. Typically, the L1 cache is the fastest cache with the least amount of data protection (e.g., it uses a parity-based protection scheme) and it operates at, or close to, the speed of the central processing unit (CPU) accessing the data. Typically, as a cache goes further upstream in the hierarchy its operating speed becomes slower based on factors such as, but not limited to, the type of physical storage device it is stored on, the capacity, and complexity of error protections schemes.

In accordance with one or more embodiments of the present invention, the cache line is made up of a plurality of sectors, with each sector containing a portion, or a subset, of the cache line. In accordance with one or more embodiments of the present invention, each cache line is made up of 256 bytes and each sector contains 16 bytes (a Quad Word or "QW"), so that a cache line is made up of 16 sectors. One skilled in the art will appreciate that other cache line and sector sizes can be implemented by other embodiments of the present invention.

As shown in FIG. 1, when a cache line is installed into the L1 data cache 102 (e.g., upon a L1 cache miss) a shadow copy of the same cache line is also installed in the SSC 104. The installation of the shadow copy of the cache line into the SSC 104 can lag behind the installation of the cache line into the L1 data cache 102 by one or more pipeline stages. In one or more embodiments of the present invention, the installation of the cache line into the SSC 104 lags behinds the installation of the cache line into the L1 data cache 102 by a variable or by a predetermined number of pipelines stages such as, but not limited to one, two, four, eight, ten, and twenty. In addition, as shown in FIG. 1, storage updates (e.g., based on instruction execution) that are applied to a cache line in the L1 data cache 102 are also applied to the shadow copy of the cache line in the SSC 104. The applying of the storage updates to the shadow copy of the cache line in the SSC 104 can lag behind applying the storage updates to the cache line in the L1 data cache 102 by the same or a different number of pipeline stages than the installation of the cache line and shadow copy.

Also as shown in FIG. 1, the data in the L1 data cache 102 is protected using byte-based parity 108 and the data in the SSC 104 is protected using a read-modify-write (RMW) ECC generation 110. In accordance with one or more embodiments of the present invention, double word based ECC is generated by reading double word data and merging in updated bytes and forming a corresponding ECC code to be written into the SSC 104 with the data. The use of this protection scheme for data stored in the SSC 104 further protects the validity of the architected storage space. In the case where a single data bit flip is detected within the double word, the data can be corrected; while a double bit flip will be detected and reported according to system requirements.

As shown in FIG. 1, a controller 116 dedicated to "store-through" operations inside the load-store unit (LSU) selects a dirty cache line(s) for cleaning. A "dirty" cache line is one that has been modified after being installed in the L1 cache 102, or has been modified (again) after the last update to the upstream L2 cache 106. "Cleaning" refers to updating an upstream cache (e.g., upstream L2 cache 106) with the modified contents of the downstream cache (e.g., L1 data cache 102), such that a "dirty" cache line in the downstream cache would be no longer "dirty."

The selected cache line is read from the SSC 104 into the RAIM payload calculator 112 which calculates the RAIM payload for the selected cache line. In accordance with one or more embodiments of the present invention, the RAIM payload and the cache line data are sent upstream to the upstream L2 cache 106 together. In accordance with one or more embodiments of the present invention, dirty line status is maintained in the SSC 104 to indicate whether a cache line has modified data that has not been sent to the upstream L2 cache 106. This information is used to determine whether the cache line will need to be sent to the upstream L2 cache 106 upon selection for cleaning. In accordance with one or more embodiments of the present invention, the dirty status is also (or instead) tracked for each sector (or other portion such as a QW) making up the cache line. This status information can be used by the SSC 104 to only send those sectors that are dirty, or that have been modified, to the upstream L2 cache 106 along with the RAIM payload which is calculated by the RAIM payload calculator 112 based on the entire cache line (e.g., all of the sectors in the cache line). A benefit to this more granular approach is a reduction in bandwidth and power consumption because less data is being sent between the SSC 104 and the upstream L2 cache 106.

Upon receiving the cache line update including the RAIM payload, the upstream L2 cache 106 locates the physical cache entry corresponding to the cache line, and then schedules a line-write operation avoiding any L2 cache 106 read request conflicts. Once scheduled, the corresponding cache line entry is written with data and RAIM payload from the SSC 104.

In accordance with one or more embodiments of the present invention, the system 100 shown in FIG. 1 implements a store-through L1 cache design. In these one or more embodiments, the SSC 104 also serves as a store-update gathering buffer (or store gathering buffer), where updates to the same cache line from different instructions can be bundled/merged together. Store-through traffic, which in contemporary approaches is based on instruction based updates, no longer need to be sent to the upstream L2 cache 106 in a piecemeal fashion. This results in a significant reduction in store-through traffic.

In addition, SSC cleaning algorithms can be adapted for a store-through design in order to optimize the pace at which when any updated (dirty) cache lines are uploaded to the upstream L2 cache 106 by reacting to: the number of dirty lines in a congruence class (e.g., if all lines in a congruence class are dirty then there is no need to wait to clean the lines in the congruence class); system level functions needing to see all updates at a system level (e.g., can proactively push all dirty lines to the upstream cache); another processor needs to see the update; periodicity and pace of regular cleaning based on L1/L2/system traffic.

In the event of an error (e.g., when L1 cache 102 and SSC 104 do not have the full line installed but have already updated part of the installed cache line), the RAIM word calculated by the RAIM payload calculator 112 of FIG. 1 is not utilized by the upstream L2 cache 106 and the processing shown in block 114 is performed. As shown in FIG. 1, if the processor core (including the L1 data cache 102) detects an error, the SSC 104 will send dirty (updated) data into the upstream L2 cache 106 with a specific command indicating that the RAIM payload is not valid. The upstream L2 cache 106 will perform a read-modify-write (RMW) RAIM payload generation on core error. This includes the upstream L2 cache 106 doing a full cache line read from its cache, merging into changed double words, generating the correct RAIM payload, and then writing into the corresponding L2 cache 106 entry.

It is to be understood that the block diagram of FIG. 1 is not intended to indicate that the system 100 is to include all of the components shown in FIG. 1. Rather, the system 100 can include any appropriate fewer or additional components not illustrated in FIG. 1 (e.g., additional caches, inputs, outputs, etc.). In addition, one or more of the components shown in FIG. 1 can be combined together or separated into two or more components. The components can be connected directly or via one or more networks. Further, the embodiments described herein with respect to system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
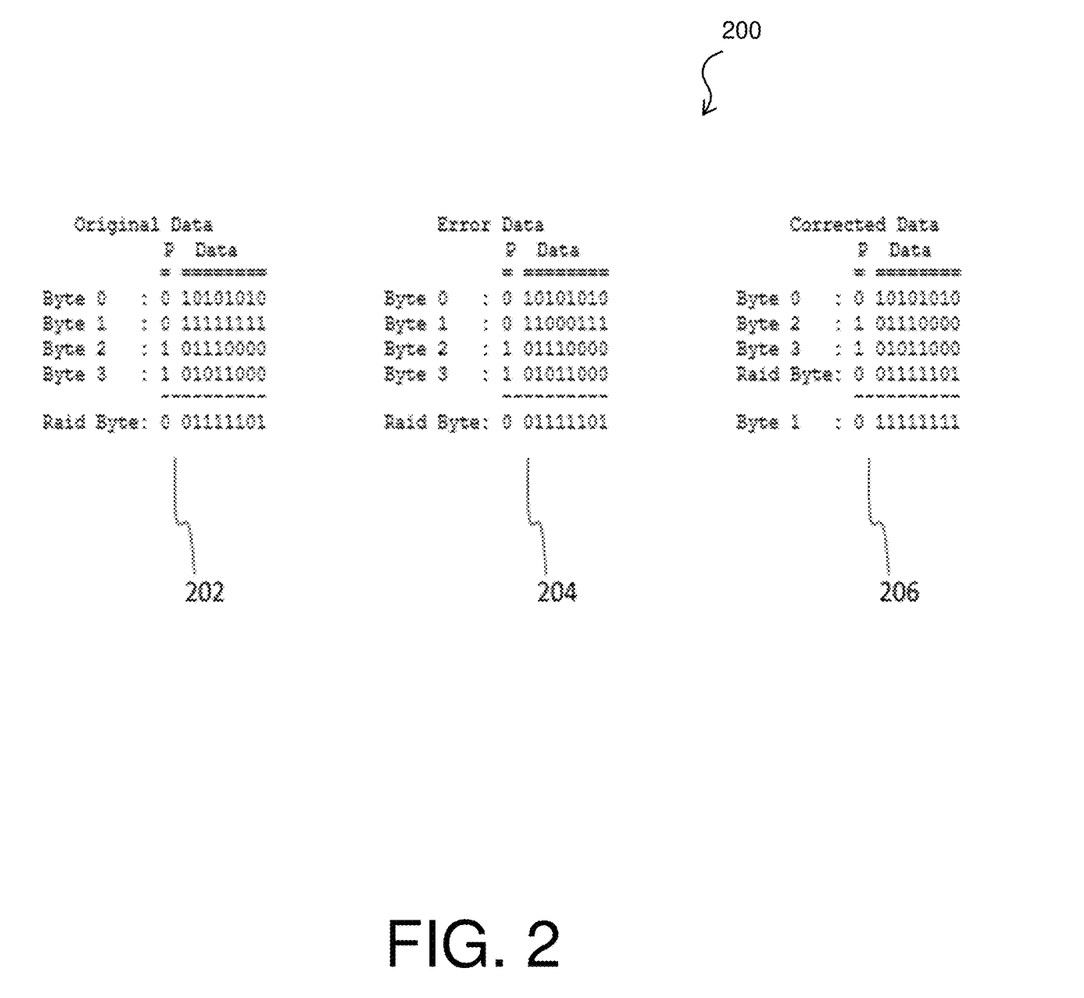
FIG. 2 depicts a block diagram of components of a cache RAIM implementation for use in conjunction with one or more embodiments of the present invention.

Turning now to FIG. 2, a block diagram 200 of components of an example of a cache RAIM implementation for use in conjunction with one or more embodiment of the present invention is generally shown. FIG. 2 is used to illustrate the method used to generate the cache RAIM and to correct errors in the data. The methods illustrated in FIG. 2 are not constrained to any particular cache line size or organization. FIG. 2 shows a segment or cache line of data that contains four bytes of data each having a byte parity bit, and a single RAIM byte with a RAIM byte parity bit. Other embodiments might have two hundred fifty-six (256) byte cache lines divided into sixteen (16) sectors, each of which contains of sixteen (16) bytes, each byte having a byte parity bit, with an additional RAIM sector of sixteen (16) bytes, with each byte having a byte parity bit. Turning back to FIG. 2, In accordance with one or more embodiments of the present invention, byte parity is kept locally with the data to detect errors and to isolate any errors to a storage array or to a group of storage arrays. The RAIM payload stored in the ECC macros is the result of the "exclusive-or" (XOR) of the data and the parity stored in each of the groups of isolatable arrays. Specifically, the parity bit of the RAIM byte is the XOR of all of the parity bits for each data byte, bit 0 of the RAIM byte is the XOR of bit 0 of all of the data bytes, bit 1 of the RAIM word is the XOR of bit 1 of all of the data bytes, and so forth. An isolatable array includes all of the possible arrays that supplied data to a failing parity check.

In accordance with one or more embodiments of the present invention, a cache line is made up of two hundred and fifty-six (256) bytes divided into sixteen Quad Words (QW) where each QW contains sixteen (16) bytes of data plus two (2) bytes of parity that are spread across two (2) arrays. This makes the RAIM payload, or RAIM QW, in this example, one-hundred and forty-four bits (144), which is the XOR of all the 144 bit data QWs, or sectors, stored in the groups of isolatable arrays for a given cache line. In accordance with one or more embodiments of the present invention, there is one RAIM QW per cache line which, when an error is detected in the cache line, can be used to recover that data that is incorrect by recreating the failing data QW The error can be detected based on parity and the RAIM word is read only when an error is detected in the cache line.

The RAIM payload can be calculated as follows:

$$QW_R = QW_0 \text{ XOR } QW_1 \text{ XOR } QW_2 \text{ XOR } QW_3 \text{ XOR } QW_4 \ldots \text{ XOR } QW_{15}.$$

where $QW_R$ refers to the RAIM QW, and $QW_0$ through $QW_{15}$ refer to the data QWs.

Therefore:

$$QW_0 = QW_R \text{ XOR } QW_1 \text{ XOR } QW_2 \text{ XOR } QW_3 \text{ XOR } QW_4 \ldots \text{ XOR } QW_{15}$$

$$QW_1 = QW_R \text{ XOR } QW_0 \text{ XOR } QW_2 \text{ XOR } QW_3 \text{ XOR } QW_4 \ldots \text{ XOR } QW_{15}$$

etc.

In order to use RAIM to recover the cache line, the stores must supply the RAIM word for the entire cache line regardless of granularity. An example of a cache line that is one word (four bytes) in length and a RAIM payload that is one byte in length is shown in block diagram 200 of FIG. 2. It should be appreciated that the example shown in FIG. 2 is simplified for ease of description and that a cache line can include a larger number of bytes and have a larger RAIM payload than that shown in the example of FIG. 2.

The cache line and RAIM payload shown in FIG. 2 include original data 202, error data 204, and corrected data 206. The original data 202 shown in FIG. 2 includes a cache line of four bytes (Byte 0, Byte 1, Byte 2, and Byte 3) and a RAIM payload of one byte (RAIM Byte). Each of the bytes shown in FIG. 2 also includes a parity bit that is stored in the L1 cache, and also in the L2 cache. The shadow cache contains an 8 bit ECC for each 8 bytes of data. The RAIM payload is generated by performing an XOR of the parity bits and the four bytes in the cache line (Byte 0, Byte 1, Byte 2, and Byte 3) The error data 204 depicts an error in Byte 1 (bits 3-5 has been changed from "111" to "000"). The corrected data 206 shows the results of using the RAIM payload, along with Byte 0, Byte 2, and Byte 3 to recreate Byte 2. Byte 1 is recreated by performing an XOR of the RAIM payload, Byte 0, Byte 2, and Byte 3.

Figure 3:
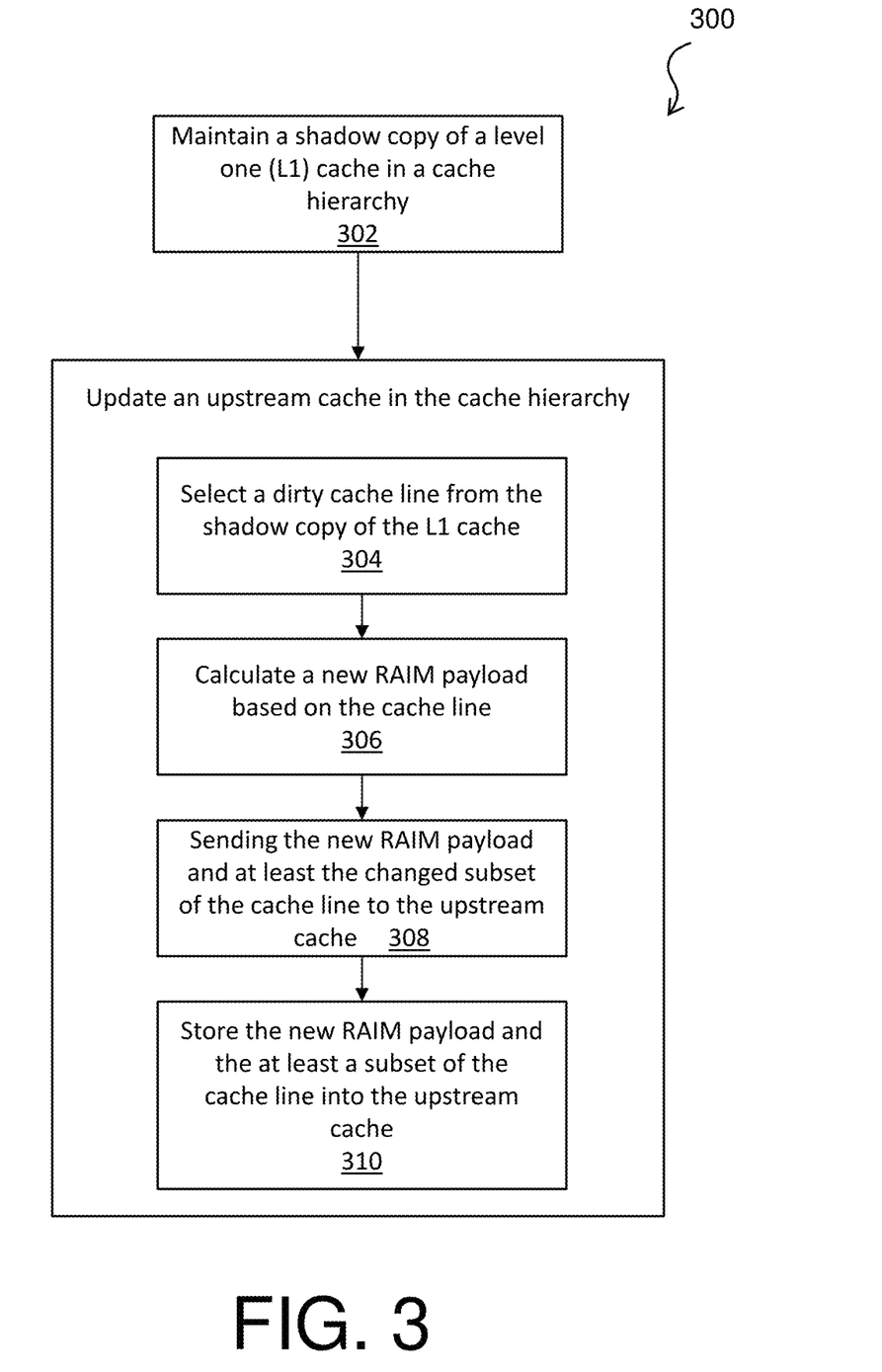
FIG. 3 depicts a process flow of a method for using a shadow copy of a L1 cache for storing into a RAIM based upstream cache memory in accordance with one or more embodiments of the present invention.

Turning now to FIG. 3, a process flow of a method 300 for using a shadow copy of a L1 cache for storing into a RAIM based upstream cache memory is generally shown in accordance with one or more embodiments of the present invention. The method 300 shown in FIG. 3 can be performed, for example, by all or a subset of system 400 of FIG. 4.

Processing begins at block 302, with maintaining a shadow copy of a L1 cache in a cache hierarchy. The shadow copy of the L1 cache mimics the installation of cache lines and the updates to cache lines in the L1 cache. In accordance with one or more embodiments of the present invention, the L1 cache is implemented by L1 data cache 102 of FIG. 1 and the shadow copy is implemented by SSC 104 of FIG. 1. In according to some aspects, the shadow copy generates an ECC code upon the updated data, thus using its own read bandwidth while mimicking the L1 cache's updates for further error protection. In accordance with some aspects, the L1 cache 102 implements a parity based protection scheme.

At block 304 of FIG. 3 a dirty cache line is selected from the shadow copy of the L1 cache. This can be performed, for example, by the controller 116 of FIG. 1. In a store-through design, the frequency of the line-based-cleaning process can be adoptive (e.g., programmable or machine learning) to system requirements, or factors, as needed by and based on: firmware (for system operations); software checkpointing (as defined by architecture); other processors/caches/I/O shared accesses (as seen through cross interrogations); time-based; cache utilization based; and/or L1 cache to/from L2 cache traffic based. At block 306, a new RAIM payload is calculated based on the entire content (all of the bits) in the selected cache line.

At block 308 of FIG. 3, the new RAIM payload and at least the changed subset of the cache line is sent to the upstream cache. In according to one or more embodiments of the present invention, the cache line is divided into a plurality of sectors each having an indicator (a "dirty indicator") of whether data in the sector has been modified subsequent to a most recent cleaning of the sector, and the changed subset of the cache line correspond to those sectors that have been modified subsequent to a most recent cleaning of the sector. In according to one or more other embodiments of the present invention, there is only one indicator for each cache line and the indicator refers to whether any bits in the entire cache line have been modified At block 310 of FIG. 3, the new RAIM payload and the changed subset of the cache line are stored into the upstream cache. In accordance with one or more embodiments of the present invention, a copy of the cache line was previously installed in the upstream cache with a previously calculated RAIM payload, and the storing includes replacing (e.g., writing over) the previously calculated RAIM payload with the new RAIM payload. The storing can also include replacing (writing over) sectors in the upstream cache that have been modified by the L1 cache. In some embodiments, the storing includes replacing the entire cache line with contents from the shadow cache. The updating can be performed without having to first read the cache line from the upstream cache, and it eliminates the need in most cases for a RMW by the upstream cache. The only exception to this occurs upon error cases, where the RAIM payload cannot be determined by the SSC 104. In these cases, the dirty lines are sent as is into the upstream cache which performs the RAIM payload generation by reading its own copy of the cache line. In accordance with one or more embodiments of the present invention, the exception can occur if any error is detected within the load-store unit. In accordance with one or more embodiments of the present invention, the exception can occur if any error is detected within the CPU.

In accordance with one or more embodiments of the present invention, the L2 cache 106 can choose to ignore the fine-grained sector based dirty indicator and write the whole cache line assuming everything (all of the bits in the cache line) is dirty.

Upon cache line eviction for cache misses, if the to-be-replaced cache line was dirty, once this dirty cache line has been stored in the upstream cache, it can be removed from the L1 cache and from the shadow copy of the L1 cache.

In accordance with one or more embodiments of the present invention, in a store-through design, the shadow copy of the L1 cache serves as a store gathering buffer, merging individual and separate instruction-based updates to a cache line, maintaining dirty cache line indications, and then updating the upstream cache level with reduced traffic as part of a cleaning process.

The process flow diagram of FIG. 3 is not intended to indicate that the operations of the method 300 are to be executed in any particular order, or that all of the operations of the method 300 is to be included in every case. Additionally, the method 300 can include any suitable number of additional operations.

Figure 4:
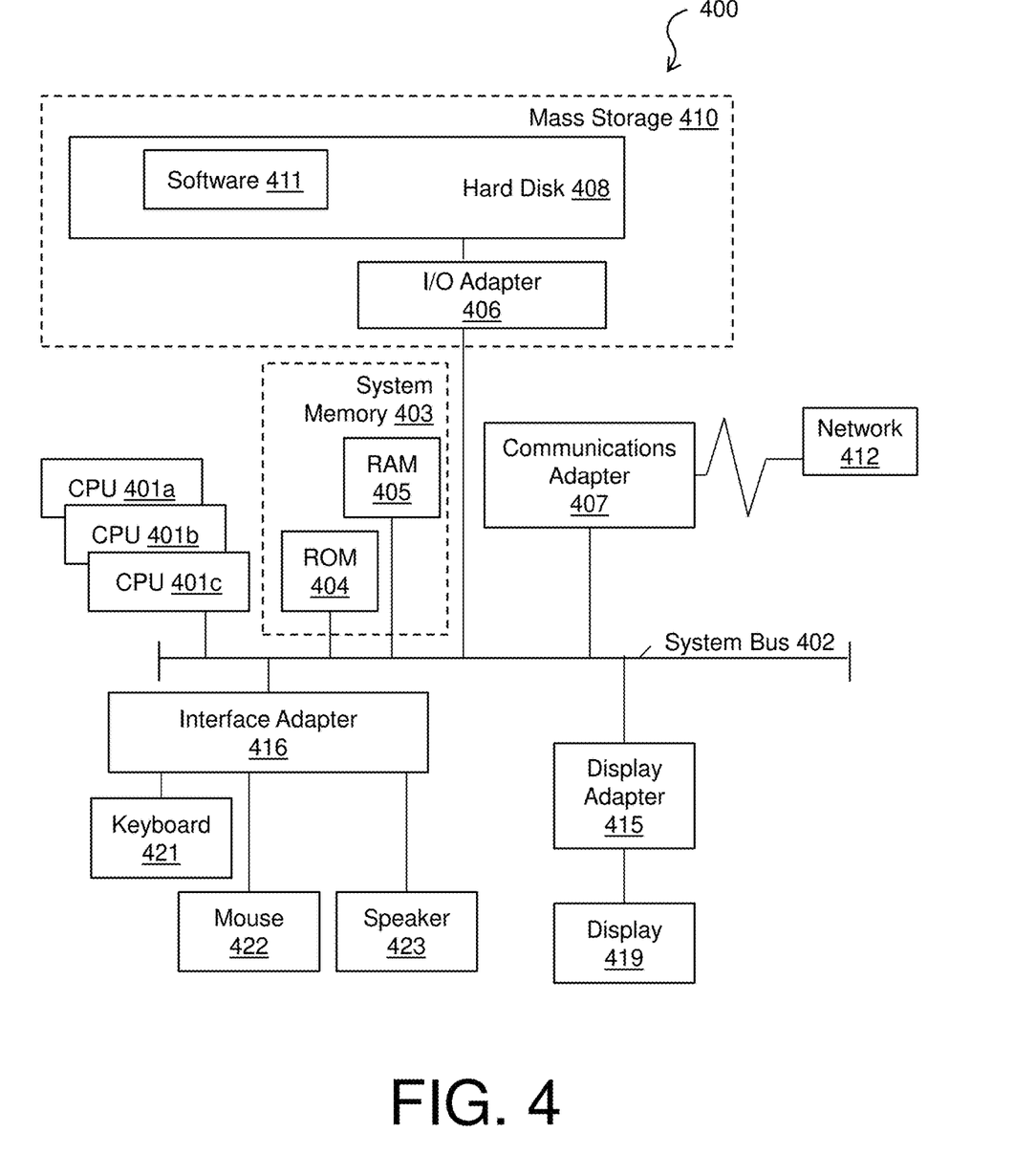
FIG. 4 depicts is a block diagram of an example computer system for use in conjunction with one or more embodiments of the present invention.

Turning now to FIG. 4, a computer system 400 is generally shown in accordance with an embodiment. The computer system 400 can be an electronic, computer framework comprising and/or employing any number and combination of computing devices and networks utilizing various communication technologies, as described herein. The computer system 400 can be easily scalable, extensible, and modular, with the ability to change to different services or reconfigure some features independently of others. The computer system 400 may be, for example, a server, desktop computer, laptop computer, tablet computer, or smartphone. In some examples, computer system 400 may be a cloud computing node. Computer system 400 may be described in the general context of computer system executable instructions, such as program modules, being executed by a computer system. Generally, program modules may include routines, programs, objects, components, logic, data structures, and so on that perform particular tasks or implement particular abstract data types. Computer system 400 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computer system 400 has one or more central processing units (CPU(s)) 401a, 401b, 401c, etc. (collectively or generically referred to as processor(s) 401). The processors 401 can be a single-core processor, multi-core processor, computing cluster, or any number of other configurations. The processors 401, also referred to as processing circuits, are coupled via a system bus 402 to a system memory 403 and various other components. The system memory 403 can include a read only memory (ROM) 404 and a random access memory (RAM) 405. The ROM 404 is coupled to the system bus 402 and may include a basic input/output system (BIOS), which controls certain basic functions of the computer system 400. The RAM is read-write memory coupled to the system bus 402 for use by the processors 401. The system memory 403 provides temporary memory space for operations of said instructions during operation. The system memory 403 can include random access memory (RAM), read only memory, flash memory, or any other suitable memory systems.

The computer system 400 comprises an input/output (I/O) adapter 406 and a communications adapter 407 coupled to the system bus 402. The I/O adapter 406 may be a small computer system interface (SCSI) adapter that communicates with a hard disk 408 and/or any other similar component. The I/O adapter 406 and the hard disk 408 are collectively referred to herein as a mass storage 410.

Software 411 for execution on the computer system 400 may be stored in the mass storage 410. The mass storage 410 is an example of a tangible storage medium readable by the processors 401, where the software 411 is stored as instructions for execution by the processors 401 to cause the computer system 400 to operate, such as is described herein below with respect to the various Figures. Examples of computer program product and the execution of such instruction is discussed herein in more detail. The communications adapter 407 interconnects the system bus 402 with a network 412, which may be an outside network, enabling the computer system 400 to communicate with other such systems. In one embodiment, a portion of the system memory 403 and the mass storage 410 collectively store an operating system, which may be any appropriate operating system, such as the z/OS@ or AIX® operating system from International Business Machines Corporation to coordinate the functions of the various components shown in FIG. 4.

Additional input/output devices are shown as connected to the system bus 402 via a display adapter 415 and an interface adapter 416 and. In one embodiment, the adapters 406, 407, 415, and 416 may be connected to one or more I/O buses that are connected to the system bus 402 via an intermediate bus bridge (not shown). A display 419 (e.g., a screen or a display monitor) is connected to the system bus 402 by a display adapter 415, which may include a graphics controller to improve the performance of graphics intensive applications and a video controller. A keyboard 421, a mouse 422, a speaker 423, etc. can be interconnected to the system bus 402 via the interface adapter 416, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 4, the computer system 400 includes processing capability in the form of the processors 401, and storage capability including the system memory 403 and the mass storage 410, input means such as the keyboard 421 and the mouse 422, and output capability including the speaker 423 and the display 419.

In some embodiments, the communications adapter 407 can transmit data using any suitable interface or protocol, such as the internet small computer system interface, among others. The network 412 may be a cellular network, a radio network, a wide area network (WAN), a local area network (LAN), or the Internet, among others. An external computing device may connect to the computer system 400 through the network 412. In some examples, an external computing device may be an external webserver or a cloud computing node.

It is to be understood that the block diagram of FIG. 4 is not intended to indicate that the computer system 400 is to include all of the components shown in FIG. 4. Rather, the computer system 400 can include any appropriate fewer or additional components not illustrated in FIG. 4 (e.g., additional memory components, embedded controllers, modules, additional network interfaces, etc.). Further, the embodiments described herein with respect to computer system 400 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram, or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented process comprising:
maintaining a shadow copy of a level one (L1) cache in a cache hierarchy, the maintaining comprising:
updating the shadow copy of the L1 cache with memory content changes to the L1 cache a predetermined fixed number of pipeline cycles after the L1 cache is updated with the memory content changes, wherein the predetermined fixed number of pipeline cycles is one of two, four, eight, ten, and twenty pipeline cycles.

2. The computer-implemented process of claim 1, further comprising updating an upstream cache in the cache hierarchy with content of the shadow copy of the L1 cache.

3. The computer-implemented process of claim 2, wherein an error detection and correction scheme employed in the upstream cache detects and corrects larger errors than a scheme employed in the L1 cache.

4. The computer-implemented process of claim 2, wherein the upstream cache implements a redundant array of independent memory (RAIM) based protection scheme, and the updating an upstream cache comprises:
  selecting a cache line from the shadow copy of the L1 cache, the selected cache line comprising unchanged content and updated content;
  calculating a new RAIM payload based on contents of the cache line;
  sending the new RAIM payload and at least the changed content to the upstream cache; and
  storing the new RAIM payload and the at least the changed content into the upstream cache.

5. The computer-implemented process of claim 2, wherein the updating an upstream cache is performed at its access granularity without first reading from the upstream cache for any unchanged content to merge with the memory content changes.

6. The computer-implemented process of claim 2, wherein a frequency of the updating an upstream cache is based on one or more programmable factors.

7. The computer-implemented process of claim 1, wherein the updating comprises invalidating a cache line from the shadow copy of the L1 cache a number of pipeline cycles after invalidating the cache line from the L1 cache.

8. The computer-implemented process of claim 1, wherein the shadow copy of the L1 cache implements an error correction code (ECC) based protection scheme.

9. The computer-implemented process of claim 1, wherein the shadow copy of the L1 cache is used as a store gathering buffer.

10. A system comprising:
  a memory having computer readable instructions; and
  one or more processors for executing the computer readable instructions, the computer readable instructions controlling the one or more processors to perform operations comprising:
    maintaining a shadow copy of a level one (L1) cache in a cache hierarchy, the maintaining comprising:
      updating the shadow copy of the L1 cache with memory content changes to the L1 cache a predetermined fixed number of pipeline cycles after the L1 cache is updated with the memory content changes, wherein the predetermined fixed number of pipeline cycles is one of two, four, eight, ten, and twenty pipeline cycles.

11. The system of claim 10, wherein the operations further comprise updating an upstream cache in the cache hierarchy with content of the shadow copy of the L1 cache.

12. The system of claim 11, wherein an error detection and correction scheme employed in the upstream cache detects and corrects larger errors than a scheme employed in the L1 cache.

13. The system of claim 11, wherein the upstream cache implements a redundant array of independent memory (RAIM) based protection scheme, and the updating an upstream cache comprises:
  selecting a cache line from the shadow copy of the L1 cache, the selected cache line comprising unchanged content and updated content;
  calculating a new RAIM payload based on contents of the cache line;
  sending the new RAIM payload and at least the changed content to the upstream cache; and
  storing the new RAIM payload and the at least the changed content into the upstream cache.

14. The system of claim 11, wherein the updating an upstream cache is performed at its access granularity without first reading from the upstream cache for any unchanged content to merge with the memory content changes.

15. The system of claim 10, wherein the updating comprises invalidating a cache line from the shadow copy of the L1 cache a number of pipeline cycles after invalidating the cache line from the L1 cache.

16. The system of claim 10, wherein the shadow copy of the L1 cache implements an error correction code (ECC) based protection scheme.

17. The system of claim 10, wherein the shadow copy of the L1 cache is used as a store gathering buffer.

18. A computer program product comprising a computer readable storage medium having program instructions embodied therewith, the program instructions executable by one or more processors to cause the one or more processors to perform operations comprising:
  maintaining a shadow copy of a level one (L1) cache in a cache hierarchy, the maintaining comprising:
    updating the shadow copy of the L1 cache with memory content changes to the L1 cache a predetermined fixed number of pipeline cycles after the L1 cache is updated with the memory content changes, wherein the predetermined fixed number of pipeline cycles is one of two, four, eight, ten, and twenty pipeline cycles.

19. The computer program product of claim 18, wherein the operations further comprise updating an upstream cache in the cache hierarchy with content of the shadow copy of the L1 cache.

* * * * *